United States Patent [19]

Ahuna

[11] Patent Number: 5,069,166
[45] Date of Patent: Dec. 3, 1991

[54] PET DISH

[76] Inventor: Stephen K. Ahuna, 25101 Via Portola, Laguna Hills, Calif. 92677

[21] Appl. No.: 518,698

[22] Filed: Sep. 15, 1989

Related U.S. Application Data

[63] Continuation-in-part of Ser. No. 347,326, May 4, 1989, abandoned.

[51] Int. Cl.⁵ .................................................. A01K 5/00
[52] U.S. Cl. ...................................................... 119/61
[58] Field of Search ........................ 119/61, 72, 74, 63; 43/124, 131, 132.1, 133

[56] References Cited

U.S. PATENT DOCUMENTS

| | | | |
|---|---|---|---|
| 1,552,076 | 9/1925 | Mosier | 119/61 |
| 2,191,811 | 2/1940 | Tramper, Sr. | 119/61 |
| 2,543,465 | 2/1951 | Morey | 119/61 |
| 2,584,301 | 2/1952 | Sinclair | 119/61 |
| 2,677,350 | 5/1954 | Prestidge et al. | 119/61 |
| 3,147,739 | 9/1964 | Shaheen | 119/61 |
| 3,441,003 | 4/1969 | Du Mond et al. | 119/61 |
| 4,007,711 | 2/1977 | Michael | 119/61 |
| 4,128,080 | 12/1978 | Haney | 119/61 |
| 4,357,905 | 11/1982 | Carpenter | 119/61 |
| 4,803,954 | 2/1989 | Welch et al. | 119/61 |

*Primary Examiner*—Gene Mancene
*Assistant Examiner*—R. Thomas Price
*Attorney, Agent, or Firm*—Frank J. Uxa, Jr.; Gordon L. Peterson

[57] ABSTRACT

An animal dish is disclosed which includes a moat sized and adapted to be filled with water to inhibit crawling insects from having access to the food or drink in the dish. The dish, which includes two elements, is configured to inhibit food or drink from the dish from passing into and contaminating the water in the moat.

20 Claims, 2 Drawing Sheets

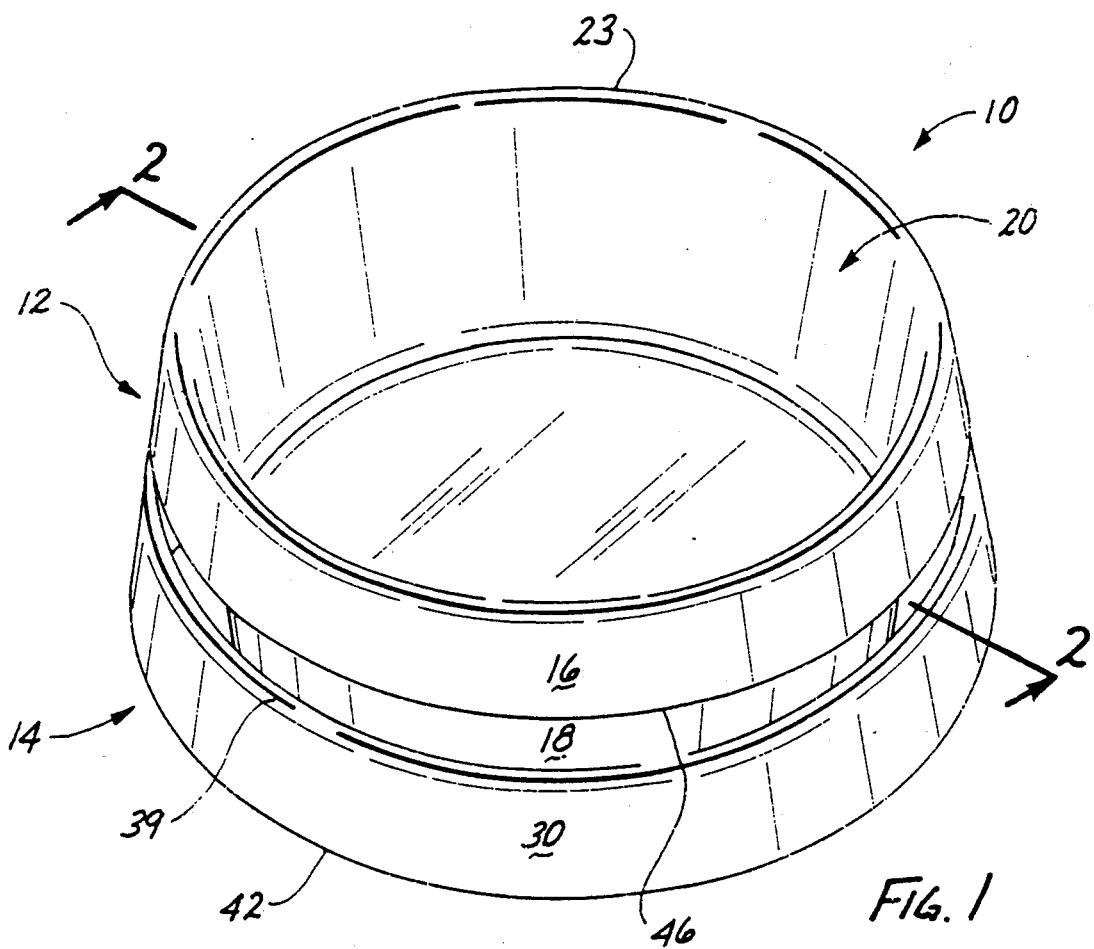
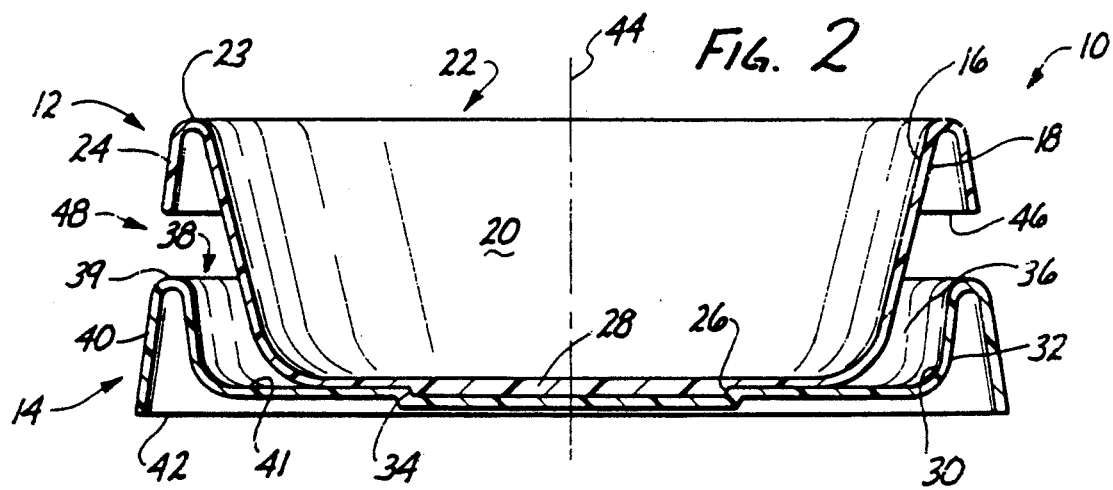

PET DISH

RELATED APPLICATION

This application is a continuation-in-part of application Ser. No. 347,326, filed May 4, 1989, now abandoned.

BACKGROUND OF THE INVENTION

The present invention relates to a dish or dish-like apparatus useful to provide food and/or drink to an animal, e.g., a household pet. More particularly, the invention relates to such an apparatus which is structured to protect the animal's food and/or drink from crawling insects.

Animals, such as household pets, often require a readily available supply of food and/or drink, e.g. water. To this end, a dish filled with food and/or drink can be provided on the floor, in a location easily accessible to the animal. Various animal dishes have been suggested which utilize a water barrier, such as a water-filled moat, to protect the food and/or drink in the dish from access by crawling insects. Examples of such dishes are found in Trampier, Sr. U.S. Pat. No. 2,191,811; Sinclair U.S. Pat. No. 2,584,301; Haney U.S. Pat. No. 4,128,080; Prestidge et al U.S. Pat. No. 2,677,350; Michael U.S. Pat. No. 4,007,711; and Carpenter U.S. Pat. No. 4,357,905;

A number of these prior art dishes involve relatively complex construction, e.g., separate stands for the dishes, and/or failed to protect the water in the water barrier from being contaminated by food from the dish. When food from the dish gets into the water barrier, the dish must be cleaned and the water in the water barrier replaced in short order to prevent unpleasant odors, harmful bacteria growth and the like.

SUMMARY OF THE INVENTION

A new animal food/drink dish has been discovered. The present dish is of relatively simple construction and is easy and economical to fabricate. Moreover, this dish provides effective protection against crawling insects, e.g., ants and the like, getting access to the animal food or drink in the dish. One important feature of the present invention is the structure of the dish which protects the water-filled moat from being contaminated with the food or drink from the dish. This feature reduces the need to constantly change the water in the moat and provides for a more sanitary and clean dish. In certain embodiments, the present dish is structured to inhibit the animal's access to the water in the moat. This reduces the chances of the animal suffering ill effects as a result of having drunk the water in the moat. The dish may also be configured to allow the moat to be filled with water from a downwardly flowing stream of water, e.g., from a conventional faucet, spigot or the like, without substantially tilting the dish. Thus, the moat can be filled after the dish has food in it without spilling the food. All in all, the present invention provides an animal dish which has a very desirable combination of properties.

In one embodiment, the present animal dish comprises at least one receptacle with a top opening for food or drink for an animal, e.g., a household pet. An angularly positioned first end portion extends outwardly and downwardly relative to the top opening of the receptacle. An annular moat surrounds the receptacle, and is sized, adapted and located to be filled with water to inhibit crawling insects from having access to the food or drink in the receptacle. The angularly positioned first end portion, preferably located substantially above the top opening of the moat, more preferably above the entirety of the top opening of the moat, acts to protect the moat from being contaminated by food or drink spilling from the receptacle or receptacles. An angularly positioned second end portion is preferably included and extends outwardly and downwardly relative to the top opening of the moat.

In a useful embodiment, the present animal dish comprises a first element and a second element sized and adapted to carry the first element. This first element includes a first surface and a generally opposing second surface. The first surface defines at least one receptacle, with a top opening, for food or drink for an animal. In one construction, this first surface extends outwardly relative to the top opening to, together with the generally opposing second surface, define a generally outwardly extending first element end portion. In another construction, the first surface extends outwardly and downwardly relative to the top opening of the receptacle to, together with the second surface, define an angularly positioned first element end portion.

The second element, to which the first element is preferably permanently secured, includes a first surface and a generally opposing second surface. The second element, preferably the first surface of the second element, carries the first element. The first surface of the second element, together with the second surface of the first element defines an annular moat. This moat, which has a top opening, is sized, adapted and located to be filled with water to inhibit, preferably substantially prevent, crawling insects from having access to the food and/or drink in the receptacle or receptacles. The first surface of the second element may extend outwardly and downwardly relative to the top opening of the moat to, together with the second surface of the second element, define an angularly positioned second element end portion.

The end portion of the second element preferably terminates in a second element end surface, preferably located below the bottom of the moat, which acts to contact a supporting surface, e.g., a floor, when the dish is in use.

The first element end portion is preferably located substantially above the top opening, more preferably substantially above the entirety of the top opening, of the moat. That is, the first element end portion preferably shields at least a portion, more preferably substantially all, of the top opening of the moat from above. Preferably, when both the first and second element end portions are angularly positioned, the angle at which the first element end portion is positioned relative to the top opening of openings of the receptacle or receptacles is substantially equal to the angle at which the second element end portion is positioned relative to the top opening of the moat. Each of these features provides for an aesthetically pleasing dish and also significantly reduces the risk that food or drink from the receptacle or receptacles will drop into and contaminate the water in the moat.

In one embodiment, the first and second elements are positioned so as to define a generally side facing access opening to the moat. This access opening is of sufficient size to allow the moat to be filled with water by passing water through the side access opening. The first and second elements are preferably positioned and structured to allow the moat to be filled through the generally side facing access opening from a downwardly flowing stream of water, e.g., from a conventional faucet, while maintaining the dish substantially level, i.e., while maintaining the central radial axis of the dish substantially vertical. This feature allows one to fill the moat after the receptacle or receptacles are filled with food and/or drink without spilling the food and/or drink. The size of the side access opening is preferably relatively small so as to substantially inhibit the animal using the dish from having access to the water in the moat. Of course, such side access opening should be of sufficient size so that crawling insects are not able to gain access through the first element across this side access opening.

The first and second elements are preferably made separately, e.g., of one or more polymeric materials, and, thereafter, permanently secured, e.g., sonically welded, together. In one useful embodiment, the first and second elements are provided with a correspondingly shaped or configured projection/indent arrangement to provide for very precise joining together of the first and second elements. For example, the first element includes a projection and the second element includes a correspondingly shaped indent. Once the projection is matingly engaged in the indent, the two elements can be secured together, e.g., using adhesives, by sonic welding or the like means of permanent securement.

The present dish can be of any suitable size and configuration. For example, the top opening or openings of the receptacle or receptacles can be circular, oval, rectangular, polygonal or the like, with circular and rectangular receptacle top openings being particularly useful.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a front top view, in perspective, of one embodiment of the dish of the present invention.

FIG. 2 is a cross-sectional view taken generally along line 2—2 of FIG. 1.

DETAILED DESCRIPTION OF THE DRAWINGS

Figure 3:
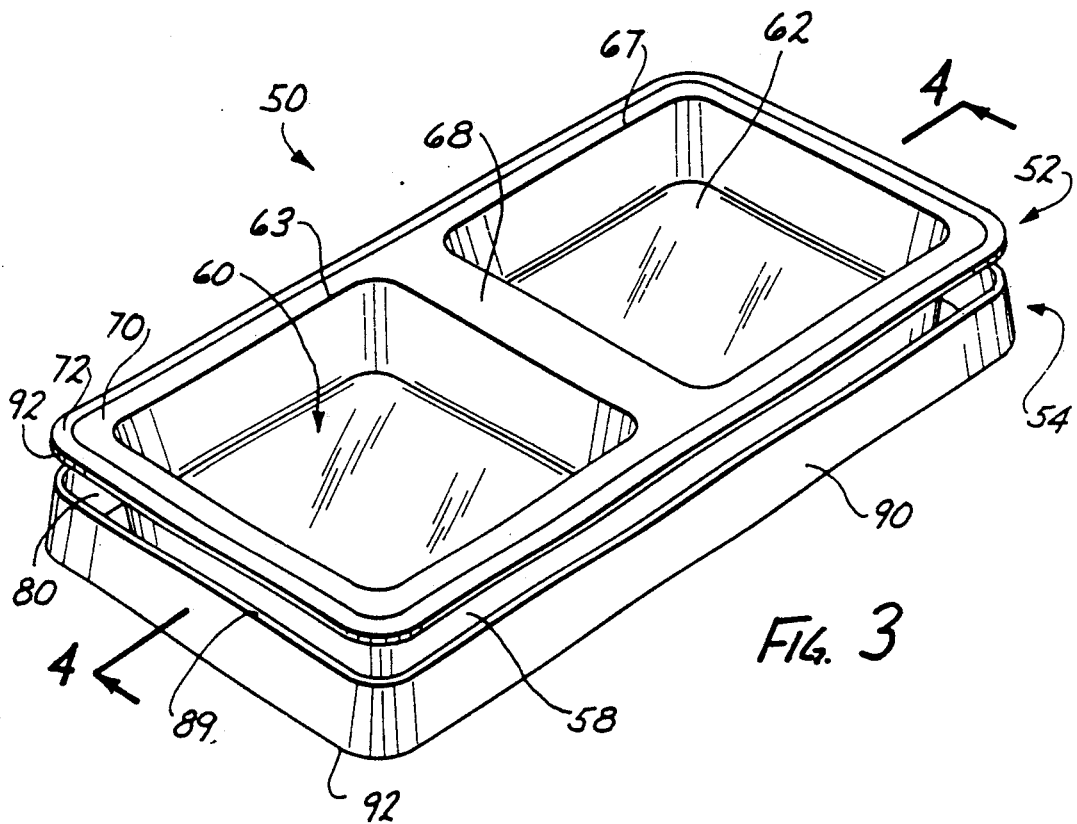
FIG. 3 is a side top view, in perspective, of another embodiment of the dish of the present invention.

Referring now to the drawings, in particular FIGS. 1 and 2, an animal food dish, shown generally at 10, includes a bowl member 12 and a base member 14. Both bowl member 12 and base member 14 are made of, e.g., molded from, a suitable polymeric material, such as polyethylene. The two pieces are sonically welded together.

Bowl member 12 includes a first surface 16 and a substantially opposing second surface 18. First surface 16 defines a food container 20 which has a generally circular top opening 22 defined by the top rim 23 of bowl member 12. Both first and second surfaces 16 and 18 of first element 12 extend, beyond top opening 22, outwardly and downwardly relative to top opening 22 to form an angled first end portion 24.

The second surface 18 of bowl member 12 has substantially the same configuration as does first surface 16 except that second surface defines a centrally located, generally circular projection 26 which extends downwardly from the bottom 28 of bowl member 12. The purpose of projection 26 is discussed hereinafter.

The base member 14 includes a first surface 30 and a substantially opposing second surface 32. First surface 30 carries bowl member 12. First surface 30 includes a centrally located, generally circular indent 34 which is sized and shaped to snugly receive projection 26. With projection 26 in indent 34, bowl member 12 is carried directly on base member 14, as shown in FIG. 2. Projection 26 and indent 34 are correspondingly sized and shaped to provide for precise relative positioning of bowl member 12 and base member 14. Once projection 26 is in indent 34, bowl member 12 is sonically welded to base member 14.

An annular moat 36 is formed by the second surface 18 of bowl member 12 and the first surface 30 of base member 14. This annular moat 36, which has a top opening 38 defined by base member top rim 39 and second surface 18 of the bowl member 12 and a bottom 41, is sized and adapted to be filled with water. This water filled moat acts as an effective barrier preventing crawling insects from reaching the food in food container 20.

First and second surfaces 30 and 32 of base member 14 extend beyond moat 36 outwardly and downwardly relative to the top opening 38 of moat 36 to form an angled second end portion 40. This angled second end portion 40 terminates in a second end surface 42 which extends below the bottom 41 of moat 36 and below the remainder of base member 14, and acts as the sole surface which contacts the floor on which dish 10 is situated.

First end portion 24 and second end portion 40 are positioned at substantially the same angle relative to the central radial axis 44 of dish 10, and relative to the top opening 22 of receptacle 20 and to the top opening 38 of moat 36. In addition, first end portion 24 is sized to substantially shield or protect the entire top opening 38 of moat 36 from above. Thus, any food, whether it be liquid or solid, which overflows or spills out of food container 20 is substantially prevented from falling into the moat 36. Not only does the first end portion 24 shield the moat 36 from above, but also, the angled orientation of first end portion 24 acts to direct any food overflow or spillage further away from moat 36.

First end surface 46 of bowl member 12 is rounded, i.e., has a substantially semi-circular cross-section. First end surface 46 and top rim 39 together define a side access opening 48 through which moat 36 can be filled with or emptied of water. The moat 36 can be filled with water through access opening 48 from a faucet or spigot emitting a downwardly flowing stream of water while the central radial axis 44 is maintained substantially vertical. This is done by directing the downwardly flowing water onto the first end portion 24. A portion of this water passes through access opening 48 to fill moat 36, as desired. The rounded first end surface 46 facilitates the downwardly flowing water entering access opening 48 and moat 36. In this manner, moat 36 can be filled with water without spilling the food from food container 20. The side orientation of access opening 48 makes it relatively difficult for the animal feeding from dish 10 to obtain access to the water in moat 36. In addition, the distance between first end surface 46 and top rim 39 is relatively small (without being so small as to allow crawling insects to cross this distance) thereby further increasing the difficulty of the animal using dish 10 gaining access to the water in moat 36.

Figure 4:
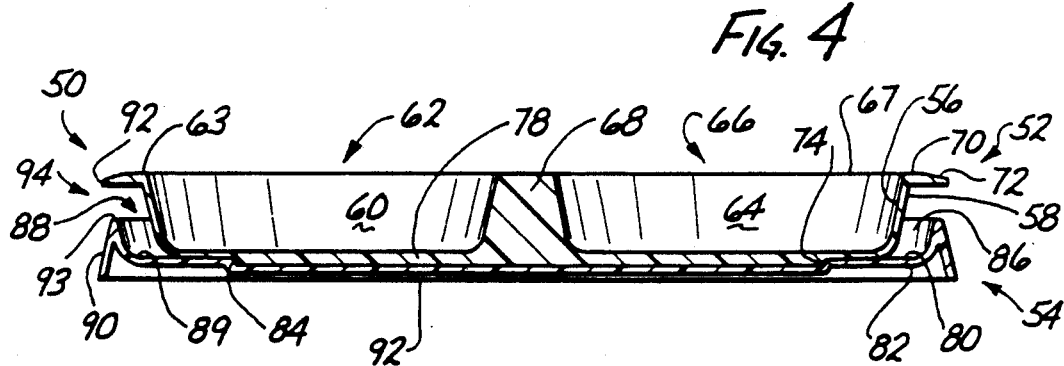
FIG. 4 is a cross-sectional view taken generally along line 4—4 of FIG. 3.

Referring now to FIGS. 3 and 4, a combination animal food/water dish is shown generally at 50. Dish 50 includes a top member 52 and a bottom member 54. Both top member 52 and bottom member 54 are made of, e.g., molded from, a suitable polymeric material, such as polyethylene. The two pieces are sonically welded together.

Top member 52 includes a first surface 56 and a generally opposing second surface 58. First surface 56 defines a food container 60 which has a generally square top opening 62 defined by the top rim 63 of food container 60. First surface 56 also defines a water container 64 which has a generally square top opening 66 defined by the top rim 67 of water container 64. Food container 60 and spaced apart water container 64 are of the same size and can be used interchangeably. Also, both of these containers can be used for food or for water, as desired. Top rim 63 of food container 60 and top rim 67 of water container 64 are located at the same height above the bottom of dish 60. First surface 16 further defines a spacer element 68 which separates food container 60 from water container 64.

Both first and second surfaces 56 and 58 of top element 52 extend beyond top openings 62 and 66 outwardly relative to top openings 62 and 66 to form a first end portion 70, which extends around the entire perimeter of top member 52. First surface 56 does angle downwardly relative to top openings 62 and 66 at the far region 72 of first end portion 70.

The second surface 58 of top member 52 has substantially the same configuration as does first surface 56 except that second surface 58 does not follow first surface 56 in the region of spacer element 68 and second surface 58 is not angled downwardly at the far region 72 of first end portion 70. In addition, second surface 58 defines a centrally located generally rectangular projection 74 which extends downwardly from the bottom 76 of top member 52.

The bottom member 54 includes a first surface 80 and a substantially opposing second surface 82. First surface 80 carries top member 52. First surface 80 includes a centrally located, generally rectangular indent 84 which is sized and shaped to smugly receive projection 74. With projection 74 in indent 84, top member 52 is carried directly on bottom member 54, as shown in FIG. 4. Projection 74 and indent 84 are correspondingly sized and shaped to provide for precise relative positioning of top member 52 and bottom member 54. Once projection 74 is in indent 84, top member 52 is sonically welded to bottom member 54.

An annular moat 86 is formed by the second surface 58 of top member 52 and the first surface 80 of bottom member 54. This annual moat 86, which has a top opening 88 defined by bottom member top rim 89 and second surface 58 of top member 52 and a bottom 89, is sized and adapted to be filled with water. This water filled moat acts as an effective barrier preventing crawling insects from reaching the food and water in food container 60 and water container 64.

First and second surfaces 80 and 82 of bottom member 54 extend beyond moat 86 outwardly and downwardly relative to the top opening 88 of moat 86 to form an angled second end portion 90. This angled second end portion 90 terminates in a bottom end surface 92 which extends below the bottom 89 of moat 86 and the remainder of bottom member 54, and acts as the sole surface which contacts the floor on which dish 50 is situated.

First end portion 70 is sized to substantially shield or protect the entire top opening 88 of moat 86 from above. Any food or water which flows or spills out of food container 60 or water container 64 is substantially prevented from falling into the moat 86. The angled end region 72 of first end portion 70 also facilitates directing any overflow or spillage from the containers further away from moat 86.

First end surface 92 of top member 52 and top rim 93 of bottom member 54 together define a side access opening 94 through which moat 86 can be filled with or emptied of water. The side orientation of access opening 94 makes it relatively difficult for the animal feeding and drinking from dish 50 to obtain access to the water in moat 86. In addition, the distance between first end surface 92 and top rim 93 is relatively small (without being so small as to allow crawling insects to cross this distance) thereby further increasing the difficulty of the animal using dish 50 gaining access to the water in moat 86.

The present invention, e.g., as embodied in dishes 10 and 50, provides a very attractive and useful means for caring for animals, such as household pets. The animal dishes of the present invention are of relatively simple construction and can be manufactured easily and inexpensively. In addition, these dishes provide a very effective barrier to crawling insects gaining access to the food or drink available in the dish. Moreover, the present dishes substantially reduce the chance of overflow or spillage of food and/or drink entering into the water filled moat. Also, in certain embodiments, the configuration of the present dishes is such as to substantially inhibit the animal using the dish from access to the water in the moat, thereby protecting the animal from possible illness or injury.

While this invention has been described with respect to various specific examples and embodiments, it is to be understood that the invention is not limited thereto and that it can be variously practiced within the scope of the following claims.

What is claimed is:

1. An animal dish comprising:
    a receptacle with at least one top opening and defining a container for food or drink for an animal;
    an angularly positioned first end portion extending outwardly and downwardly relative to said top opening of said receptacle and terminating in a first end surface; and
    a base member secured to said receptacle and together with said receptacle defining an annular moat surrounding said receptacle, said moat being sized, adapted and located to be filled with water to inhibit crawling insects from having access to the food or drink in said container, said base member having a top rim located below said first end surface and a portion of said container being located below said top rim.

2. The dish of claim 1 wherein said base member has a peripheral end surface which extends below the remainder of said base member and acts to contact a supporting surface when said dish is in use.

3. The dish of claim 1 which further comprises an angularly positioned second end portion extending outwardly and downwardly relative to said top rim of said base member.

4. The dish of claim 1 wherein said moat has a top opening and said angularly positioned first end portion is located substantially above the entirety of said top opening of said moat, and which further comprises a generally side facing access opening to said moat of a size sufficient to allow said moat to be filled with water while substantially inhibiting the animal using said dish from having access to the water in said moat.

5. The dish of claim 1 wherein said base member is permanently secured to said receptacle.

6. An animal dish comprising:
a first element including a first surface and a generally opposing second surface, said first surface of said first element defining at least one container for food or drink for an animal, said container having a top opening, said first surface of said first element extending outwardly and downwardly relative to said top opening to, together with said second surface of said first element, define an angularly positioned first element end portion terminating in a first end surface; and
a second element including a first surface, a generally opposing second surface and a top rim located below said first end surface, and being sized and adapted to carry said first element so that a portion of said container is located below said top rim, said second surface of said first element and said first surface of said second element together defining an annular moat sized, adapted and located to be filled with water to inhibit crawling insects from having access to the food or drink in said container.

7. The dish of claim 6 wherein said moat has a top opening and said angularly positioned first end portion is located substantially above said top opening of said moat.

8. The dish of claim 6 wherein said moat has a top opening and said first surface of said second element extends outwardly and downwardly relative to said top opening of said moat to, together with said second surface of said second element, define an angularly positioned second element end portion.

9. The dish of claim 8 wherein said angularly positioned second element end portion terminates in a peripheral second element end surface which extends below the remainder of said second surface of said second element and acts to contact a supporting surface when said dish is in use.

10. The dish of claim 8 wherein the angle at which said first element end portion is positioned relative to said top opening of said container is substantially equal to the angle at which said second element end portion is positioned relative to said top opening of said moat.

11. The dish of claim 10 wherein said angularly positioned first element end portion is located substantially above the entirety of said top opening of said moat.

12. The dish of claim 8 wherein said second surface of said second element extends outwardly and downwardly relative to said top opening of said moat.

13. The dish of claim 6 wherein said second surface of said first element extends outwardly and downwardly relative to said top opening of said receptacle.

14. The dish of claim 6 wherein said first and second elements are permanently secured together.

15. The dish of claim 14 wherein said first element includes a projection or an indent and said second element includes a correspondingly sized and shaped indent or projection positioned to be matingly associated with said projection or indent of said first element 16. The dish of claim 14 wherein said moat has a top opening and said angularly positioned first element end portion terminates in a rounded first element end surface which, together with said second element defines a generally side facing access opening to said moat sized and configured to allow said moat to be filled with water from a downwardly flowing stream of water while maintaining said dish substantially level.

17. An animal dish comprising:
a first element including a first surface and a generally opposing second surface, said first surface defining at least one container for food or drink for an animal, said container having a top opening, said first surface extending outwardly relative to said top opening to, together with said second surface or said first element, define a generally outwardly extending first element end portion terminating in a first end surface; and
a second element permanently secured to said first element, including a first surface, a generally opposing second surface and a top rim located below said first end surface, and being sized and adapted to carry said first element so that a portion of said container is located below said top rim, said second surface of said first element and said first surface of said second element together defining an annular moat having a top opening and being sized, adapted and located to be filled with water to inhibit crawling insects from having access to the food or drink in said container, said first surface of said second element extending outwardly and downwardly relative to said top opening of said moat to, together with said second surface of said second element, define an angularly positioned second element end portion.

18. The dish of claim 17 wherein said angularly positioned second element end portion terminates in a peripheral second element end surface which extends below the remainder of said second surface of said second element and acts to contact a supporting surface when said dish is in use.

19. The dish of claim 17 wherein said first element end portion is located substantially above the entirety of said top opening of said moat.

20. The dish of claim 17 wherein said first element end portion terminates in a first element end surface which, together with said second element, defines a generally side facing access opening to said moat of a size sufficient to allow said moat to be filled with water while substantially inhibiting the animal using said dish from having access to the water in said moat.

* * * * *